US006327032B1

(12) United States Patent
Lajeunesse et al.

(10) Patent No.: US 6,327,032 B1
(45) Date of Patent: Dec. 4, 2001

(54) METHOD AND APPARATUS FOR IMAGING A CARTRIDGE CASE EJECTOR MARKINGS

(75) Inventors: Benoit Lajeunesse, Ste Dorothee; Luc Laurin, Brossard; Yvan Boudreau, Melocheville, all of (CA)

(73) Assignee: Forensic Technology (Wai) Inc., Montreal (CA)

( * ) Notice: Subject to any disclaimer, the term of this patent is extended or adjusted under 35 U.S.C. 154(b) by 0 days.

(21) Appl. No.: 09/052,173

(22) Filed: Mar. 31, 1998

(30) Foreign Application Priority Data

Sep. 16, 1997 (WO) .................................. PCT/CA97/00661

(51) Int. Cl.[7] .................................................. G01B 11/00
(52) U.S. Cl. ............................................ 356/390; 356/394
(58) Field of Search ..................................... 356/390, 394, 356/375, 373; 250/460, 561; 358/101, 106, 107

(56) References Cited

U.S. PATENT DOCUMENTS

| 3,780,614 | 12/1973 | Maire . |
| 3,991,599 | 11/1976 | Rowley et al. . |
| 4,135,778 | 1/1979 | Lincoln . |
| 4,735,497 | 4/1988 | Elterman . |
| 5,379,106 | 1/1995 | Baldur . |
| 5,390,108 | 2/1995 | Baldur . |
| 5,633,717 | 5/1997 | Baldur . |
| 5,654,801 | 8/1997 | Baldur . |
| 5,659,489 | 8/1997 | Baldur . |

FOREIGN PATENT DOCUMENTS

| 593 232 | 2/1934 | (DE) . |
| 37 23 361 | 2/1988 | (DE) . |
| 42 04 500 | 8/1993 | (DE) . |
| 0 775 889 | 5/1997 | (EP) . |
| 2 105 226 | 3/1983 | (GB) . |
| WO97/21128 | 6/1997 | (WO) . |

*Primary Examiner*—Robert H. Kim
*Assistant Examiner*—Michael P. Stafira
(74) *Attorney, Agent, or Firm*—Swabey Ogilvy Renault; James Anglehart

(57) ABSTRACT

The invention provides an apparatus and method for imaging markings on cartridge cases. It provides for the taking of two images of the cartridge case with light for illumination projected at the cartridge case from two different predetermined angles. In a first version, two different light sources are set at the two different predetermined angles. In a second version, one light source is moved between two different positions to project light at the two different predetermined angles. In a third version, the device holding the cartridge case is rotated between two different positions so light projects at the cartridge case from the two different predetermined angles. In a fourth version, the holding device rotates the cartridge case between two different positions so that light projects at the cartridge case at the two different predetermined angles. In another aspect, the invention provides diffuse light for the taking of the images. In yet another aspect, the invention provides a cartridge case holding device which can rotate the cartridge case about a longitudinal axis.

50 Claims, 9 Drawing Sheets

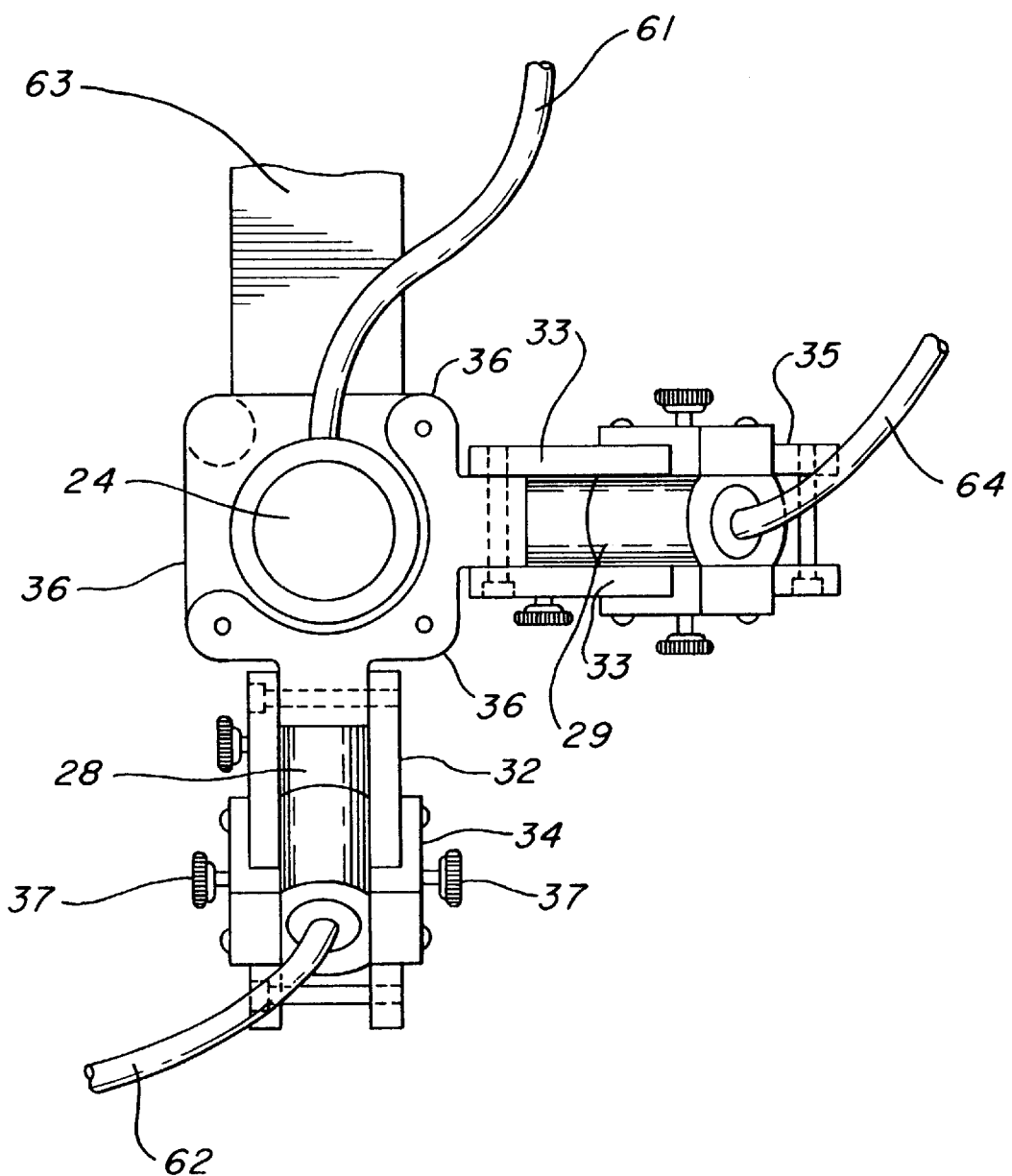

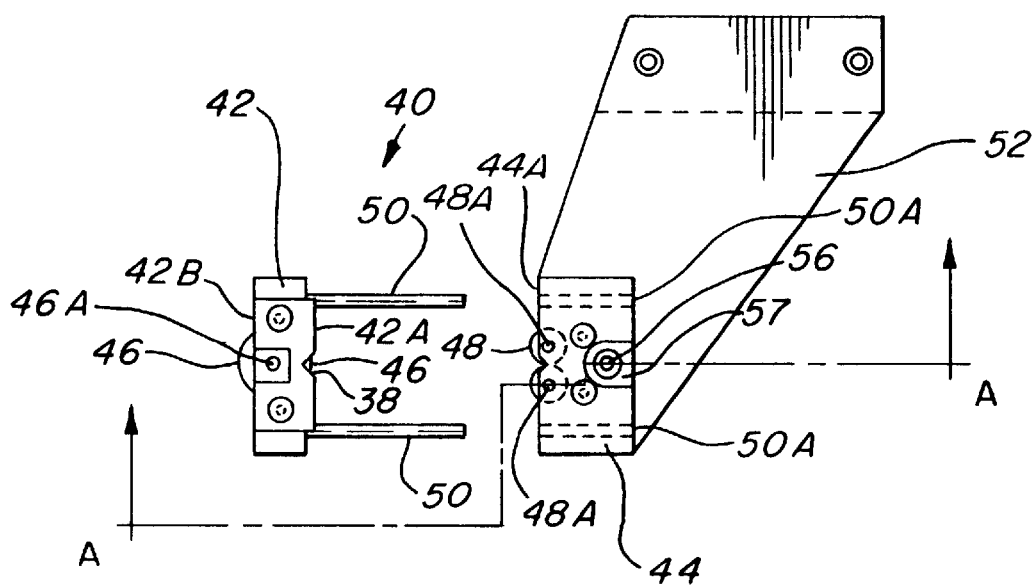
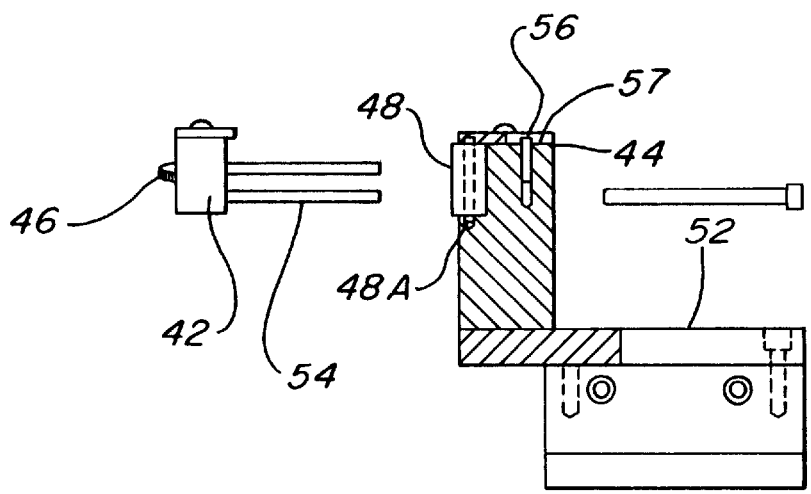
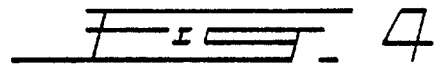

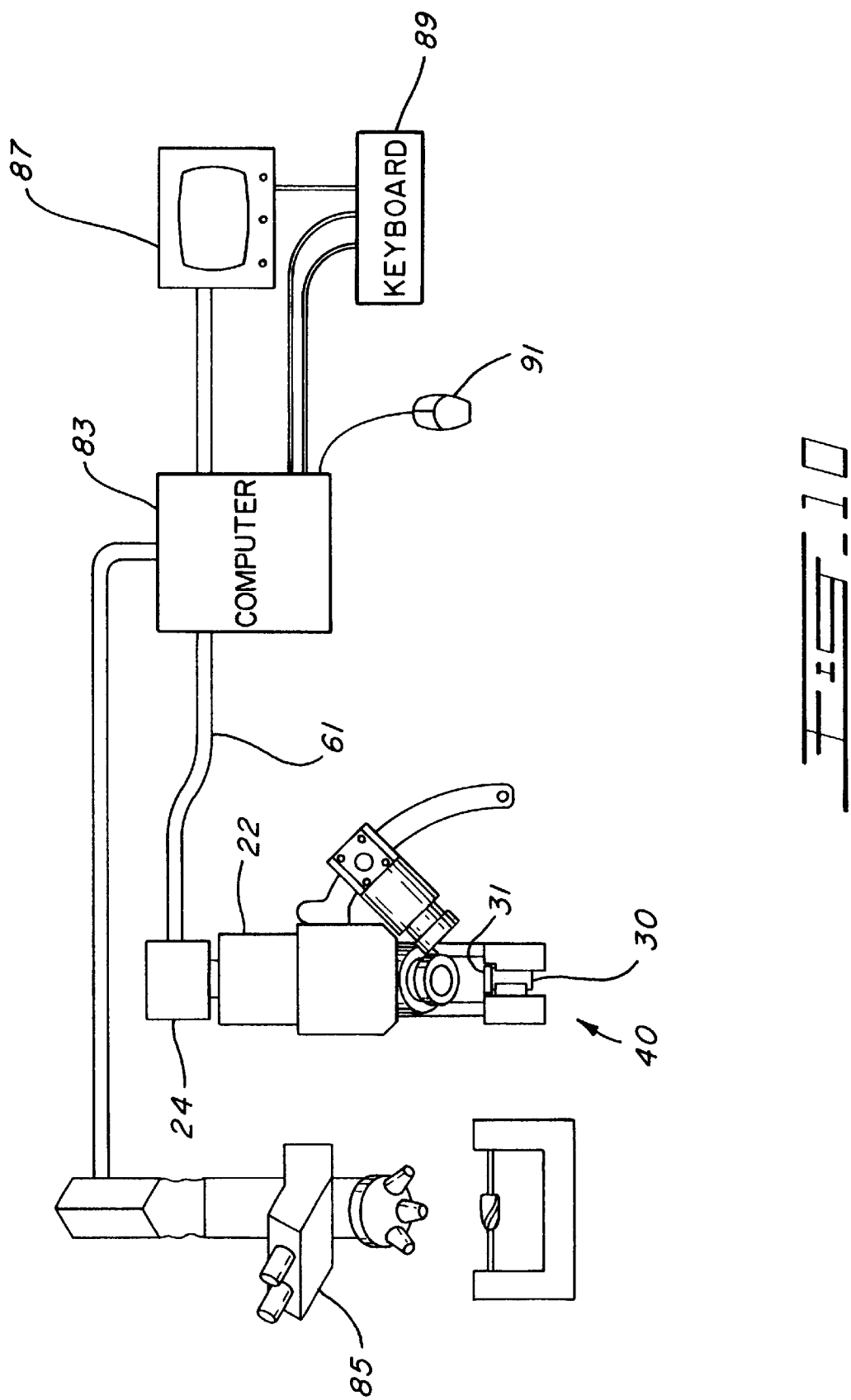

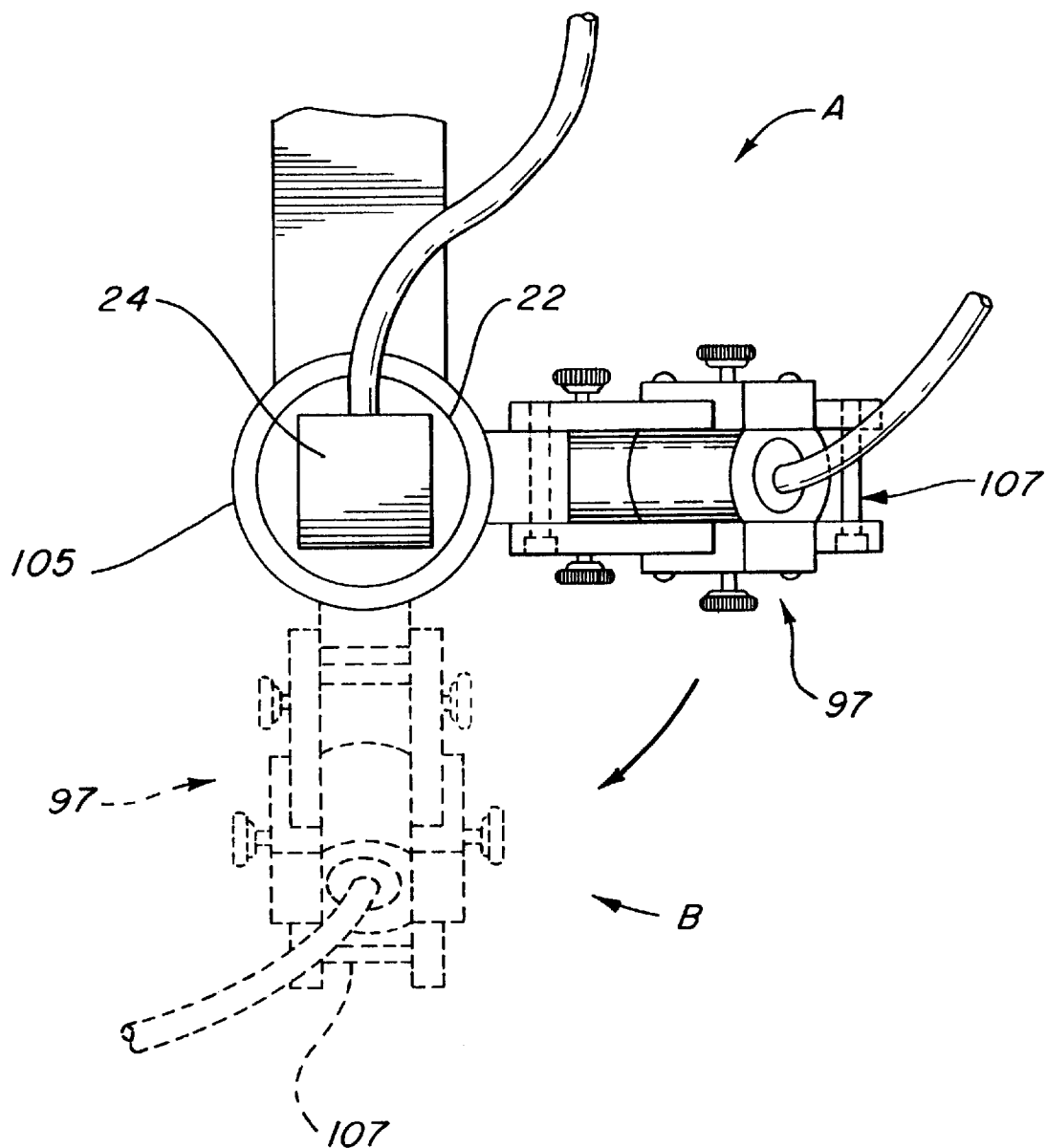

METHOD AND APPARATUS FOR IMAGING A CARTRIDGE CASE EJECTOR MARKINGS

FIELD OF INVENTION

The present invention relates to fired cartridge case examination imaging apparatuses for use during forensic analysis of spent cartridge cases. The invention more particularly relates to an apparatus and method to image an ejector mark on a cartridge case.

BACKGROUND OF INVENTION

Forensic analysis of spent bullets and cartridge cases by experts since at least the 1920's has provided law enforcement organizations with a very effective technique for solving crimes involving firearms. However, the process of comparison of markings on cartridge cases and bullets has always been a time consuming and complicated process for the ballistics expert. Typically, a trained ballistics expert or technician can spend one to two hours comparing just two different bullets or cartridge cases. A trained technician would have to spend a day or more to compare several bullets or shells. Because of the difficult nature of the process, law enforcement agencies in the past have only used analysis by comparison of bullets or cartridge cases when they were reasonably sure a match would exist or in preparation for trial, due to the time consuming and complex nature of the work. Thus, it was impractical if not impossible, to use comparison of cartridge cases and spent bullets in the initial investigative process. A typical crime scene today, where firearms have been used in the commission of a crime, can have a significant numbers of spent cartridge cases and bullets given the widespread availability of automatic and semi-automatic weapons. Thus, an important and significant need has existed for some time to automate and systematize the process of forensic analysis of spent bullets and cartridge cases to make it an effective investigative tool.

A number of significant developments have occurred over the last several years in the area of automated spent bullet and cartridge case analysis. In fact, the owner of the rights to the present application has been involved in a number of breakthrough developments in this field of technology. Some of the more significant developments are as follows:

U.S. Pat. No. 5,390,108 COMPUTER AUTOMATED BULLET ANALYSIS APPARATUS, and U.S. Pat. No. 5,659,489 METHOD AND APPARATUS FOR OBTAINING A SIGNATURE FROM A FIRED BULLET, incorporated herein by reference. These patents disclose an apparatus and method for automated analysis and comparison of spent bullets. The system produces images of the spent bullets, digitalizes those images, then stores the images for later electronic comparison to determine if a potential match exists between the subject bullet and similarly acquired images of bullets from the same or a different crime scene. Thus, with this system the tedious task of comparing spent bullets from many crime scenes is automated and the time needed to do the analysis drastically reduced.

U.S. Pat. No. 5,379,106 METHOD AND APPARATUS FOR MONITORING AND ADJUSTING THE POSITION OF AN ARTICLE UNDER OPTICAL OBSERVATION, incorporated herein by reference. This patent described among other things a method and apparatus for automating the positioning of a spent bullet for imaging.

U.S. Pat. No. 5,633,717 METHOD FOR MONITORING AND ADJUSTING THE POSITION OF AN OBJECT UNDER OPTICAL OBSERVATION FOR IMAGING, incorporated herein by reference. This patent disclosed another refinement for automating the positioning of an object for optical observation.

U.S. Pat. No. 5,654,801 FIRED CARTRIDGE EXAMINATION METHOD AND IMAGING APPARATUS, incorporated herein by reference. This patent provides an apparatus and method of illuminating the breech face of a cartridge case with axial symmetric lighting in order to obtain images of firing pin impressions on the breech face of a spent cartridge case.

The above systems provide the forensic scientist analyzing spent bullets and cartridge cases with effective tools for comparing spent bullets or cartridge cases in a variety of situations. The systems can be used to examine and analyze spent bullets from a specific crime scene with spent bullets or cartridge cases from a multitude of other crime scenes. Another use, among a number of possibilities, is in the examination of fired bullets or spent cartridge cases from a suspect firearm. Thus, the police in conducting an investigation of a crime scene from which it obtains spent bullets and/or cartridge cases have the ability to compare them with thousands of others from widely different crime scenes within a very short period of time. Naturally, a trained forensic ballistics expert has to make the final determination of whether or not a match exists between various bullets or shells. The inventions referred to above and the one described in this specification and its claims provide powerful analytical tools for standardized, systematized and automated analysis and comparison of literally thousands of cartridge cases and bullets in a matter of minutes and present the expert with a short list of the ones which offer the best match. In the list of potential matches it also provides a priority on those that make the best match. Thus with the inventions referred to herein the expert no longer has to individually handle, sift through and compare hundreds or thousands of possibilities. However, even before the expert examines the short list of potential matches the list itself provides significant leads to the police for their investigation.

The above patents generally relate to imaging and analyzing, with appropriate methods and apparatus, the markings left by a gun barrel on spent bullets, the impressions left by the breech face of a gun on the top of the head of the cartridge case and the impression left by the firing pin on the primer of a cartridge case. However, during loading, firing and ejection of a cartridge case the ejector mechanism of the gun also leaves a unique impression on the cartridge case. This results from the fact that during the manufacturing process of a firearm the machining and milling operations leave each ejector mechanism surface with slightly different engravings which are unique to the specific firearm.

The ejector mark which appears on the rear face of a cartridge case varies in depth and in degree of definition depending on the unique ejector mechanism of each firearm. The ejector mark usually starts at the edge of the rim of the top of the head of the cartridge case and generally extends in a linear direction across the cartridge case surface as the result of movement of the ejector. The ejector mark generally has a number of striations or other significant markings which give it a unique character and thus identify it a being made by the ejector mechanism of a specific firearm. However, given the location of the ejector mark and their general configuration and depth, imaging and lighting techniques and apparatus which have been developed for efficient standardized and systematized analysis and comparison as described in the above patents, and as now, practiced do not provide adequate means for obtaining good images which can be used for efficient standardized and systematized comparison and analysis of ejector mark images on cartridge cases obtained from a wide variety of locations and at different times. All of the above mentioned methods of lighting, have proved inadequate for obtaining necessary and useful images for standardized and systematized comparison and analysis of ejector mark. Accordingly, there is a need for an imaging system which can obtain useful images of an ejector mark for standardized and systematized comparison and analysis. There is also a need for a method and apparatus for properly positioning of a cartridge case for imaging of the ejector mark, which neither current practice, nor the above mentioned patents meet.

SUMMARY OF THE INVENTION

It is an object of the present invention to provide an efficient and effective method and apparatus for obtaining suitable images for standardized and systematized comparison and analysis of an ejector mark on a cartridge case. In brief, the object of the present invention is achieved by taking two images of the ejector mark on the cartridge case with lighting for illumination set at a first predetermined position for the first image and lighting for illumination set at a second predetermined position for the second image.

It is a further object of the present invention to provide a method and apparatus to manipulate the orientation of a cartridge case into a desired imaging position.

According to the invention there is provided an apparatus for imaging ejector mark on a cartridge case, said apparatus having: a cartridge case holding device for holding a cartridge case in a predetermined orientation for imaging when the holding device is positioned in an imaging position, an imaging device mounted with its optical axis positioned to image the top of the head of a cartridge case being held by the holding device, a light source mounted in a first predetermined position for illuminating the cartridge case held by the holding device for obtaining a first image by the imaging device, a light source mounted in a second predetermined position for illuminating the cartridge case held by the holding device for obtaining a second image by the imaging device. The images thus obtained can be used for comparative analysis.

In another aspect of the invention, to provide a light source at the first and second predetermined position, it includes a first light source at the first predetermined position and a second light source at the second predetermined position.

In yet another variation of the invention, to provide a light source at the first and second predetermined positions, it includes a single light source mounted for movement between the first and second predetermined position.

In yet another variation of the invention, to provide a light source at the first and second predetermined position, it includes a fixed light source with the holding device set on a rotating stage to rotate the holding device from the first to the second predetermined position to place the cartridge case at the first and second predetermined position for imaging.

In yet another variation of the invention, to provide a light source at the first and second predetermined position, it includes a holding device which rotates the cartridge case from the first predetermined position to the second predetermined position.

In a further aspect of this invention the preferred embodiment calls for positioning the light sources at the first and second predetermined positions such that directional axis of illumination of the light source at the first predetermined position is in an orthogonal relationship to the directional axis of the light source at the second predetermined position and both the directional axis of the light source at the first predetermined position and the directional axis of the light source at the second predetermined position make an oblique angle of approximately 30 degrees with the plane of the top of the head of the cartridge case being imaged.

In a further aspect of this invention it also provides a device for holding and positioning a cartridge case for imaging which has a first plate with a face side, and a second plate with a face side, the plates being detachably biased towards each other on their face sides so that they securely hold between them a cartridge case with the longitudinal axis of the cartridge case approximately parallel to the face of the first plate and the second plate so that the breech face of the cartridge case is in an imaging position, with means to rotate the cartridge case about its longitudinal axis.

In a further aspect of this invention the means to rotate the cartridge case around its longitudinal axis is comprised of at least one roller on the face side of the first plate and two rollers on the face side of the second plate, the axis of rotation of all the rollers being substantially parallel to each other and the rollers positioned such that when the faces of the plates are biased towards each other, so the rollers can securely hold there between them a cartridge case with the longitudinal axis of the cartridge case parallel to the axis of the rollers and the rollers being free to rotate the cartridge case about its longitudinal axis. In another aspect of this invention the holding device has one of its rollers offset at an acute angle to provide for movement of the cartridge case along its longitudinal axis towards an imaging position.

In yet another aspect of this invention it provides diffuse light to further enhance the images produced by the practice of this invention. The diffuse light in one variation is provided by projecting it onto the cartridge case from a source of diffuse light. Such diffuse light can be provided by a specific source of such light. Another variation of this aspect of the invention calls for diffusing in part light projected onto the cartridge case for imaging purposes. A generally opaque but translucent light diffuser placed over the cartridge case partially diffuses the projected light.

According to the invention, there is also provided a method for imaging ejector mark on a cartridge case which comprises:

placing at an imaging position a cartridge case holding device for holding a cartridge case in a predetermined orientation for imaging;

positioning an imaging device so the optical axis is positioned to image the breech face of a cartridge case held by the holding device;

mounting a light source in a first predefined position for illuminating the cartridge case held by the holding device;

illuminating the cartridge case with the light source;

obtaining a first image with the imaging device;

removing the illumination by the light source;

mounting a light source in a second predefined position for illuminating the cartridge case held by the holding device;

illuminating the cartridge case with the light source;

obtaining a second image with the imaging device; and using the images obtained for comparative analysis.

In a further aspect of the method of this invention the step of positioning the light source at the first and second predetermined positions includes positioning a first light source at the first predetermined position and positioning a second light source at the second predetermined position.

In a further aspect of the method of this invention the step of positioning the light source at the first and second predetermined positions includes moving a light source mounted for movement from the first to the second predetermined position.

In a further aspect of the method of this invention the step of positioning the light source at the first and second predetermined positions includes rotating the holding device, which has been mounted for rotational movement, from the first predetermined position to the second predetermined position.

In a further aspect of the method of this invention the step of positioning the light source at the first and second predetermined positions includes rotating the cartridge case, which has been placed in the holding device for rotational movement, from the first to the second predetermined position.

In a further aspect of the method of this invention the step of positioning the imaging device comprises positioning the optical axis of the imaging device so that it is perpendicular to the plane of the breech face of the cartridge case and centering the optical axis on ejector mark on the breech face of the cartridge case.

In a further aspect of the invention the step of mounting the first light source in the first predetermined position comprises mounting it in a tangential orientation to the ejector mark on the cartridge case and mounting the second light source in the second predetermined position comprises mounting it in a radial position to the ejector mark on the cartridge case.

In yet another aspect of the method of this invention, mounting the light sources includes mounting the first and second light sources such that their directional axes make an angle of approximately 30 degrees with the plane of the breech face of the cartridge case being imaged.

In yet another aspect of the method of this invention diffuse light is provided to better enhance the image produced by the practice of this invention. In one variation the diffuse light is provided by partially diffusing the directional light projected onto the image. In another variation diffuse light is provided by surrounding ambient light or by a separate light source provided for this purpose.

BRIEF DESCRIPTION OF THE DRAWINGS

The invention will be better understood by way of the following detailed description of the preferred embodiment with reference to the appended drawings, in which:

FIG. 2 is an overhead view of the apparatus of the preferred embodiment;

FIG. 3 is an overhead view of the cartridge holding device of the preferred embodiment with the two main plates of that device separated;

FIG. 4 is a cross sectional view of the cartridge holding device taken along line A—A in FIG. 3;

FIG. 10 a schematic diagram of the major components of the invention;

FIG. 12 an overhead view of an alternative embodiment of the invention wherein the light source moves from the first to second predefined position.

DETAILED DESCRIPTION OF THE PREFERRED EMBODIMENT

I. Overview

Figure 1:
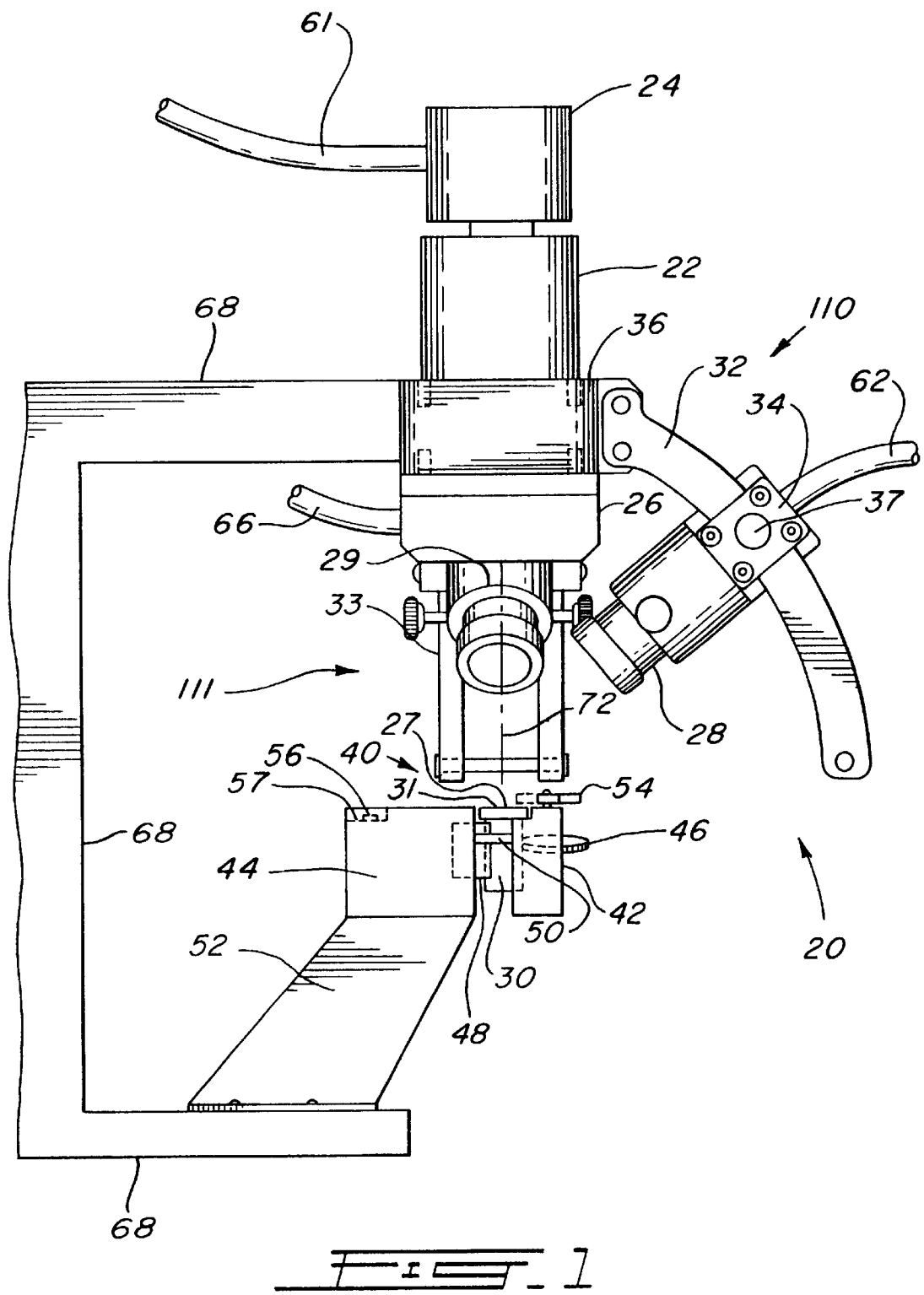
FIG. 1 is a perspective view of the apparatus according to the preferred embodiment.

The overall apparatus of the system appears in FIG. 1. The system includes a microscope 22 and an image capturing device 24, which in the preferred embodiment, is a standard charged coupled device 24 (CCD). In FIG. 1 the CCD 24 attaches to the microscope 22 which in turn is securely mounted by bracket 36. The microscope 22 is positioned to image surface 31, a breech face of a cartridge case 30. Cartridge case mounting block 40 holds the cartridge case 30 with the breech face of the cartridge case 31, at imaging position 27 facing the microscope 22. Cable 61 provides a control line as well as a power line for the microscope 22 and CCD 24. Line 61, in the preferred embodiment, connects to both a computer 83 FIG. 10 as well as a microscope viewing apparatus 85. Images which the microscope 22 focuses on are fed to the CCD 24. In turn, the CCD 24 transmits those images to the computer 83 for imaging on a computer screen 87, as well as processing, analysis and storage. The operator, in a manner known in the industry, would use the computer 83 to control the overall operation of the system including adjusting the focus of the microscope 22 and movement and adjustment of the various parts of the apparatus as those movements are described herein. Since the preferred embodiment also provides an microscope viewing apparatus 85 FIG. 10 the operator also has the option of using this device to view the images and adjust the focus of the microscope.

Bracket 36 FIG. 1 connects to common base 68 for support. Common base 68, also has attached to it mounting plate 52 which securely holds plate 44 of cartridge case mounting block 40. Movable plate 42, of mounting block 40 attaches to the second plate 44, of mounting block 40. Plates 42 and 44 are securely but detachably biased towards each other by connectors 50 so that plates 42 and 44 can hold between them the cartridge case 30. Mounting block 40 which holds cartridge case 30 with its breech face 31 at imaging position 27 will be described in more detail at a later point in this description.

As will be described in more detail below, the key to the proper practice of this invention requires the establishment of a strict protocol for obtaining the images for comparative analysis. In brief, the images must be obtained under the same lighting conditions with the imaging device oriented in the same way with respect to the top of the head of the cartridge case. The lighting conditions require that the light for illumination be set in a predetermined position each time so that a directional axis of the light strikes the top of the head of that cartridge case at the same predefined angle each time. Two images are taken of each cartridge case with light provided at different predefined position and angle of illumination for the first and second image. The two imaging positions of the preferred embodiment of the various aspects of the invention being identified by reference numbers 110 and 111 in various of the figures. By following the teachings of the invention described herein one can obtain standardized images which highlight those aspects which differentiate the ejector mark of one firearm from another. Additionally, since the teachings of the invention provide for obtaining the images in a uniform manner, the predefined position and angle for each of the images always being the same, a ballistics expert can use the images of each cartridge case so obtained from different sources for comparative analysis.

In the preferred embodiment practice of the invention would consist of the following steps: 1. Placing the top of the head 31 of the cartridge case 30 at an imaging position 27; 2. mounting the imaging device 22 so that its optical axis is perpendicular to the plane of the top of the head 31 of the cartridge case 30 held at the imaging position 27; 3. illuminating the cartridge case for a first image by placing the light source 28 at a first predetermined position 110 FIGS. 1, 9A and 11A so that the light source projects down at the top of the head of the cartridge case and strikes it at a predefined angle of illumination which makes in the preferred embodiment an approximately 30 degree angle with the top of the head of the cartridge case and is in a tangential orientation to the ejector mark; 4. illuminating the cartridge case for a second image by placing the light source 29 at a second predetermined position 111 FIGS. 1, 9B, and 11B so that the light source projects down on the top of the head of the cartridge case and strikes it at a second predefined angle of illumination which makes an approximately 30 degree angle with the top of the head 31 of the cartridge case 30 and is in a radial orientation to the ejector mark on the cartridge case; and 5. Controlling or neutralizing ambient light and the intensity of the imaging light.

Once the images are obtained they are then stored on a suitable medium accessible in a useable form by a suitably programmed computer system 83 as depicted in FIG. 10 as is well know in the computer arts and used in conjunction with the invention described herein and the aforementioned and incorporated patents. The computer system would be programmed in such a fashion that a ballistics expert can display the images from different cartridge cases to be compared side by side, or otherwise, to allow the expert to determine if a possible match exists. A number of ways exist, well known to those skilled in the computer arts, which allow for storage and display of the images for the ballistics expert to compare and analyze the images from different cartridge cases.

II. Object Illumination

Figure 5A:
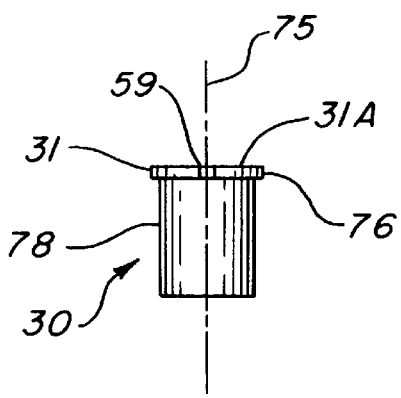
FIG. 5A is a side view of a typical cartridge case.
Figure 5B:
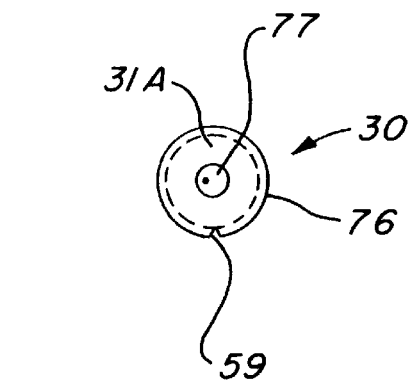
FIG. 5B is a view of the top of the head of a cartridge case.

First light source 28 and second light source 29 provide illumination for taking appropriate images of the top of the head 31 of the cartridge case 30 FIGS. 1 and 5B, specifically the ejector mark 59 FIG. 5B thereon. These light sources project beams of light not much bigger than the top surface 31 of the cartridge case 30. Both light sources 28 and 29 project beams of white light, provided in the preferred embodiment, through fiber optic cables 62 and 64 FIGS. 1 and 2, from a source of white light not shown.

Referring to FIG. 1 and FIG. 2 bracket 36 holds support arm 32 in position and bracket 34 attaches light source 28 to support arm 32. Support arm 32 and light source 28 are configured such that the directional axis of the first light source 28 (the direction axis being the axis along which a light source directs its beam of light) always points at imaging position 27. Knob 37 can be used to adjust bracket 34 and thus allow for movement of light source 28 along support arm 32. The arc of support arm 32 is configured such that the directional axis of light source 28 will always point at imaging position 27. The arc of support arm 32 forms the arc of quarter of a circle, the center of which is at the imaging position 27. Referring to FIG. 2 bracket 36 also holds support arm 33 in place, and bracket 35 holds the second light source 29 in place. Second light source 29 and support arm 33 are configured in the same fashion as first light source 28 and support arm 32, namely the directional axis of illumination of light source 29 would remain pointed at imaging position 27 as the operator moves light source 29 along support arm 33. Support arm 33 also describes an arc of a quarter of a circle whose center is located at imaging position 27. Cord 62 provides power for first light source 28 and is a fiber optic cable in the preferred embodiment depicted in FIG. 1. Likewise for second light source 29 a similar power cord, in this case a fiber optic cable 64 FIG. 2 provides the light.

The angle of the directional axis of the light source 28 makes with respect to the plane of the top 31A of the head 31 of cartridge case 30 can be varied from 0 degrees to almost 90 degrees. As noted above, adjustable bracket 34 allows for movement of light source 28 to achieve the desired angle. FIG. 1 depicts the preferred embodiment wherein the directional axis of light source 28 makes a predefined angle of approximately 30 degrees with the plane of the top of the head 31 of cartridge case 30.

Support arm 33 and light source 29 operate in a similar fashion as support arm 32 and light source 28, such that the direction axis of light source 29 can be varied anywhere from 0 degrees to 90 degrees with respect to the plane of the top of the head 31 of cartridge case 30. However, here again, the predefined angle of the directional axis of light source 29 to the plane of the top of the head 31, of cartridge case 30 for imaging the ejector mark is around approximately 30 degrees.

FIG. 2 provides a view of the entire system looking down from above. As can be seen, in the preferred embodiment the first light source 28 and second light source 29 are at right angles to each other. The best mode for the practice of the invention calls for the directional axis of light source 29 and light source 28 to be in an orthogonal position, 90 degree or perpendicular position to each other. This arrangement provides the optimal images. It is also possible to obtain usable images with the light sources 28 and 29 at a different angle to each other. In that case, various apparatuses can be used to allow an operator to vary the angle between light source 28 and 29. Several variations are discussed below.

Figure 6:
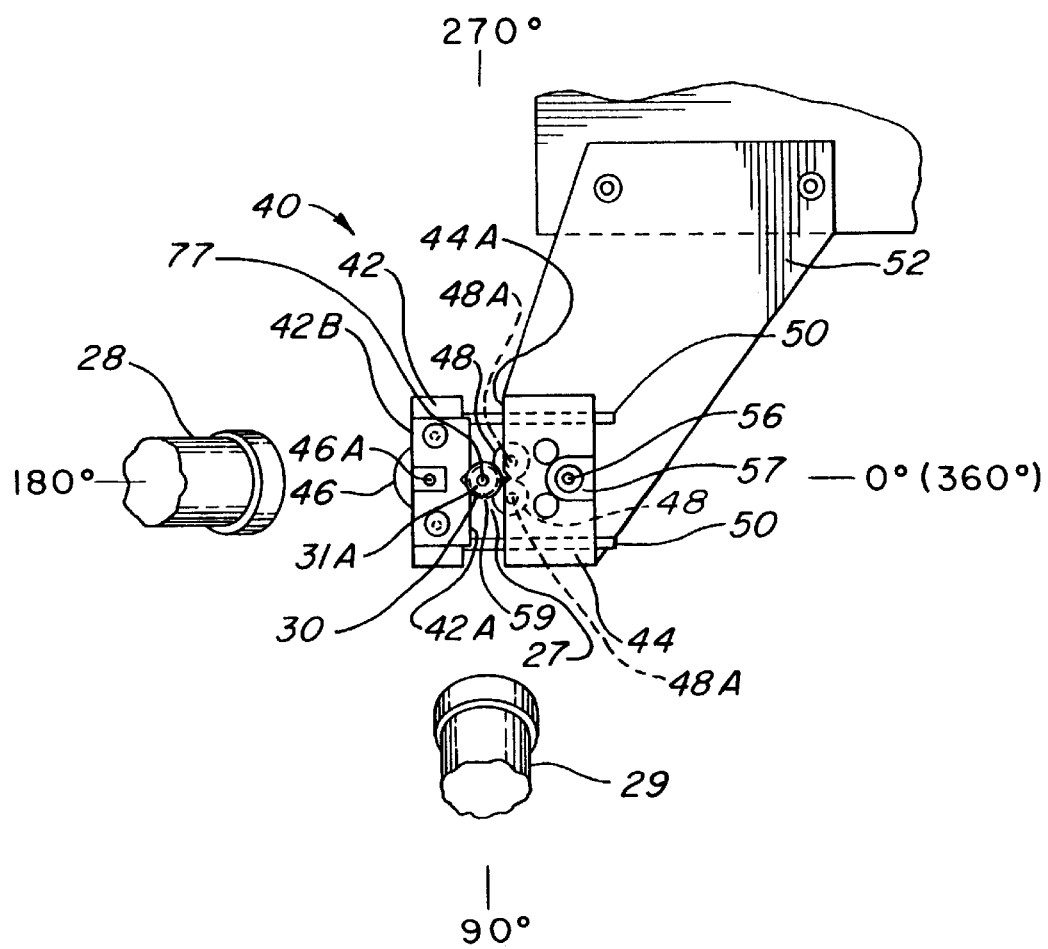
FIG. 6 is an overhead view of the cartridge case holding device set in the imaging position with partial views of the light sources and reference degrees indicate.

As noted above, proper practice of the invention requires the establishment of a strict and uniform protocol for taking each of the images for comparison and analysis. Two images must be taken of each cartridge case with the optical imaging device in the same position with light for illumination provided from two different but standard predefined angles. The light source being set in two different but standard predetermined positions for each image taken of each cartridge case for the comparative analysis of all cartridges cases imaged. The two predetermined positions allow for the establishment of two predefined angles of illumination one for each of the two images taken as part of the process. Referring to FIGS. 1 and 6 the predetermined position of the preferred embodiment is to position light sources 28 and 29 so that their directional axis are at right angles to each other and they both make an angle of approximately 30 degrees with the plane of the breech face 31 of the cartridge case 30. More particularly, in the preferred embodiment the first predefined angle will have the directional axis of the first light source projecting down at about a 30 degree angle to the plane of the top of the head 31 of the cartridge case 30 in a tangential direction to the ejector mark. The second predefined angle will have the second light projecting down at about a 30 degree angle to the plane of the top of the head 31 of cartridge case 30 in a radial direction to the ejector mark Thus with each successive cartridge case this same protocol must be followed to create the necessary and distinct but comparable images necessary for comparative analysis by a ballistics expert.

FIG. 6 has marked thereon as a reference frame in the plane of the top of the head 31 of cartridge case 30, the degrees of a circle with its center at the center of the breech face 31 of the cartridge case 30 where the longitudinal axis 75 of the cartridge case 31 crosses the plane of the top of the head 31. In FIG. 6 the plane 31 is the paper surface and axis 75 would be projecting out of the paper at the firing primer 77 position perpendicular to the paper. With the center of the circular top of the head of cartridge case 30 at 77, the ejector mark 59 and imaging position 27 would be on the edge of the circle which forms the top of the head 31 of cartridge case 30. Thus, the directional axis of the second light source 29 projects in a radial direction towards imaging position 27 at the ejector mark 59, passing from the 90 degree position to the 270 degree position. The directional axis of the first light source 28 would project on the imaging position 27 in a tangential direction to ejector mark 59 passing from the 180 degree position to the 360 or 0 degree position. Naturally, as noted above, the predetermined position of the preferred protocol would include projecting the light from light sources 28 and 29 towards imaging position 27 so their directional axis intersect the plane of the breech face 31 at approximately 30 degrees. Additionally, the protocol of the preferred embodiment also includes control of the intensity of the light source, diffusing that light and neutralization of ambient light from the surroundings of the apparatus which will be discussed in detail below.

Although, the invention calls for a preferred embodiment with the first and second predefined angles of illumination set at approximately 30 degrees to the plane of the top of the head or breech face 31 of cartridge case 30 and in either a radial or tangential direction the preferred protocol could be modified and the invention still practiced. The angular relationship between the axis of illumination of light sources 28 and 29 could be varied from an angle of more or less than 90 degrees. Conceivably, it could be varied over a range of from 1 to 179 degrees although anything much more than several degrees greater or less than the orthogonal or 90 degree relationship between the first predetermined position and the second predetermined position in reality is impractical. Also, the first and second predefined angles could be varied from the 30 degree angle practiced in the preferred embodiment. Here again conceivably it could be varied from a position where the directional axis makes an angle of a few degrees with the plane of the top of the head of the cartridge case to close to a 90 degree angle with the plane of the top of head of the cartridge case. However, for all practical purposes once you change that angle more than several degrees greater or lesser than the approximately 30 degrees of the preferred embodiment, in reality, it becomes impractical if not impossible to practice the concept of the invention. Finally, once you set the protocol for the practice of this invention it is absolutely imperative that all images to be compared be taken with the light sources at the same angles under exactly the same lighting conditions. Failure to follow the same protocol for taking the images for each successive cartridge case make it difficult to practice the invention. Also, as will be noted in detail below, the preferred embodiment also calls for the introduction of diffuse light to further enhance the quality of the image and increase the texture and definition of the image obtained. The more detailed statement below will describe how the light from the light sources can be partially diffused or separate diffuse light can be introduced to create the desired effect.

Figure 9:
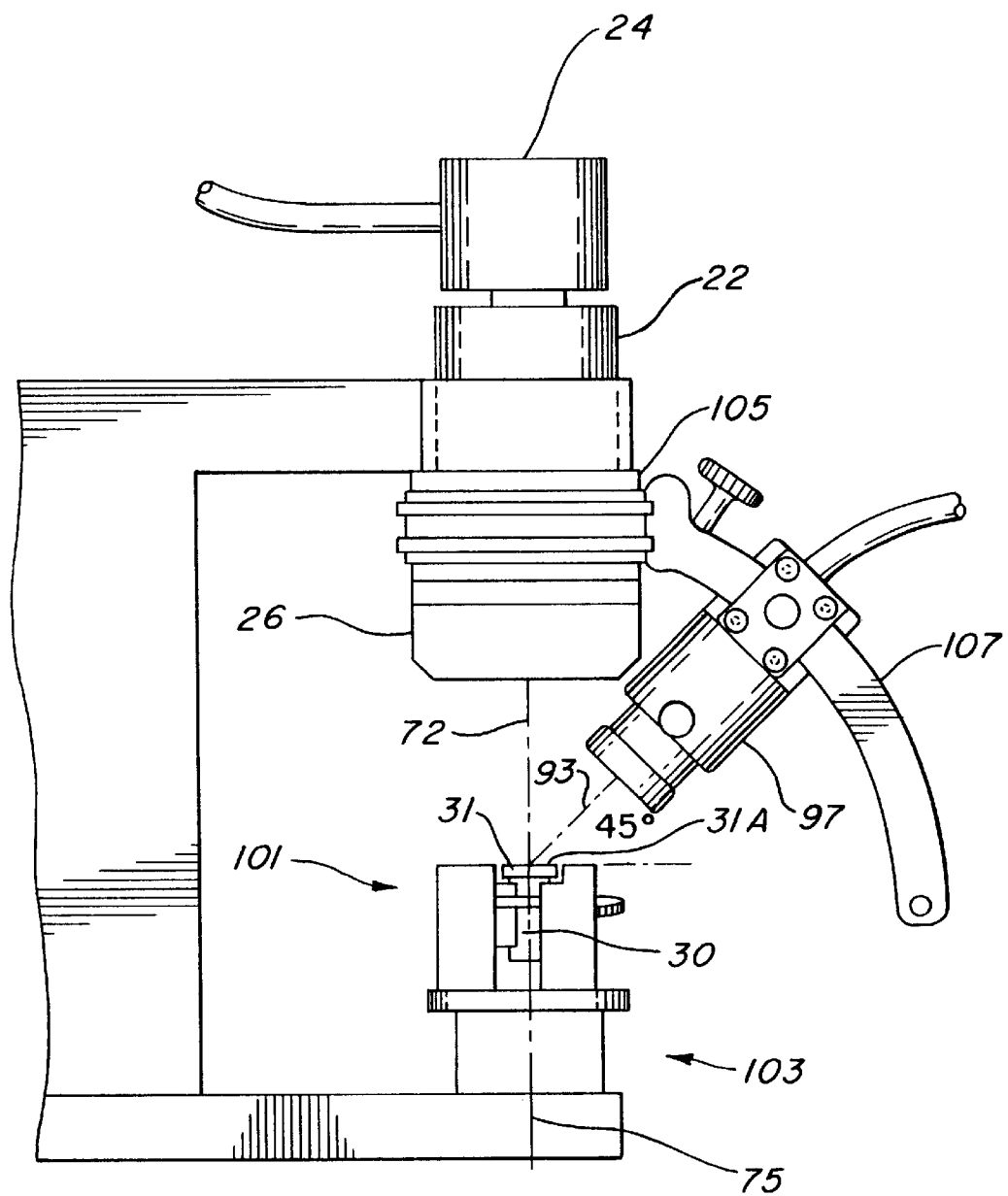
FIG. 9 provides a view of two additional embodiments of the subject invention.

Although the preferred embodiment described above uses two separate light sources to provide the illumination necessary, other arrangements exist which can accomplish the object of this invention. FIG. 9 depicts three alternative versions for providing illumination for taking images of the cartridge case with light from the first and second predetermined position of illumination. All can be used individually or together to accomplish the desired result. The first alternative as depicted in FIG. 12 provides for movement of the light source 97 from the first predetermined position A for illumination for the first image to the second predetermined position B to illuminate the cartridge case for the second image. In this version, light source 97 attaches to support arm 107 which in turn attaches to rotating mechanism 105 FIG. 12. Thus, light source 97 could be positioned at the first predetermined position as depicted by light source 28 at the tangential position in FIG. 6 and then rotated by the rotating mechanism 105 FIG. 12 to the second predetermined position as depicted by light source 29 at the radial position in FIG. 6. In this manner two images of the ejector mark could be obtained with light from the first predetermined position of illumination and then the second predetermined position of illumination. As depicted in FIG. 9 lights source 97 is held securely by arm 107 in a position where its directional axis 93 forms a 30 degree angle with the plane 31A of the top of the head 31 of cartridge case 30. This angle would be maintained as light source 97 is rotated from the tangential orientation of the preferred embodiment to the radial orientation of the preferred embodiment. Rotating mechanism 105 is a fairly standard mechanical device.

Figures 9A, 9B:
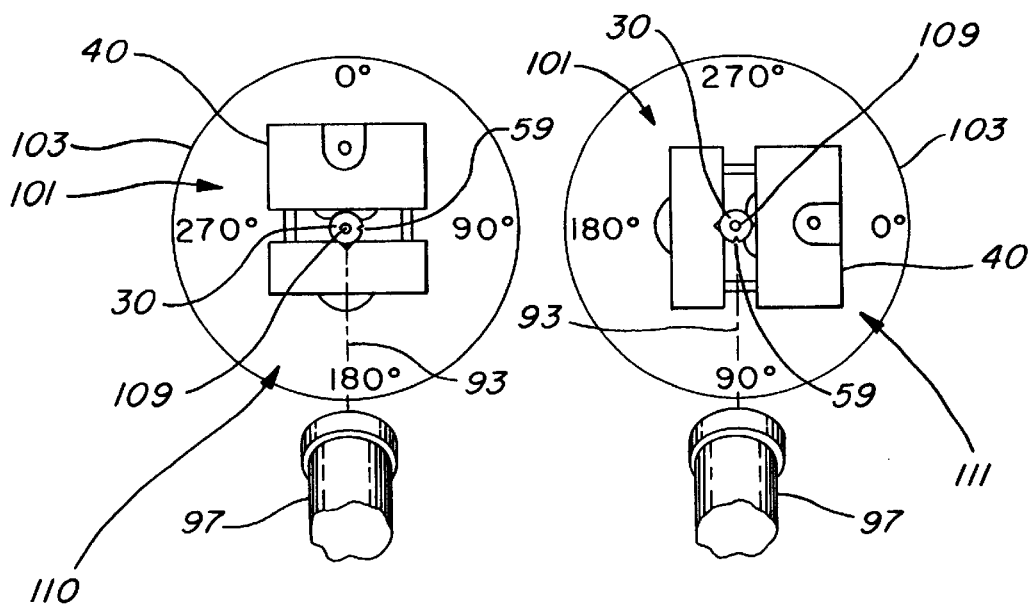
FIG. 9A an overhead view an alternate embodiment of the holding device with the light source in a tangential orientation to the ejector mark.
FIG. 9B an overhead view of an alternate embodiment of the holding device with the light source in a radial orientation to the ejector mark.

A second alternative depicted by FIG. 9 calls for securing a single light source 97 in a fixed position and rotating the cartridge case holding device 101. Cartridge case holding device 101 sits on rotating stage 103. The cartridge case 30 is at the center of the stage with the axis of rotation of the stage 103 being congruent with the longitudinal axis 75 of the cartridge case 30 when the cartridge case 30 is positioned on the stage between the plates of the holding device 101. Thus, rotating stage 103 rotates everything on it about the longitudinal axis 75 of cartridge case 30. As depicted in FIG. 9A and 9B the longitudinal axis 75 intersects at point 109 the top of the head 31 of cartridge case 30 and is perpendicular to the top of the head 31 of cartridge case 30, axis 75 is thus perpendicular to the plane FIGS. 9A and 9B projecting out from them. As depicted in FIGS. 9A and 9B as rotating stage 103 rotates through 90 degrees from FIG. 9A to 9B the position of directional axis 93 of light source 97 crosses the cartridge case 30 from the 180 degree tangential position with respect to ejector mark 59 in FIG. 9A to the 90 degree radial position with respect to ejector mark 59 in FIG. 9B. Thus, the appropriate illumination at the first and second predetermined positions of illumination are obtained by rotating Rotating Stage 103. However, when you rotate stage 103 to reposition the cartridge case with respect to the light source, ejector mark 59 moves away from the imaging position 27 and the focal point of the microscope 22. Thus an additional translational move of the stage 103 is necessary to reposition the ejector mark 59 back at imaging position 27. Those skilled in the art will realize that repositioning of stages 103 can be easily accomplished given the general configuration of the available apparatus. Thus, given the need for the repositioning of the cartridge case to place it back at the imaging position 27, in most applications, moving from the first predetermined position to the second predetermined position when using the Rotating stage 103 would include this additional translational move.

Figures 11A, 11B:
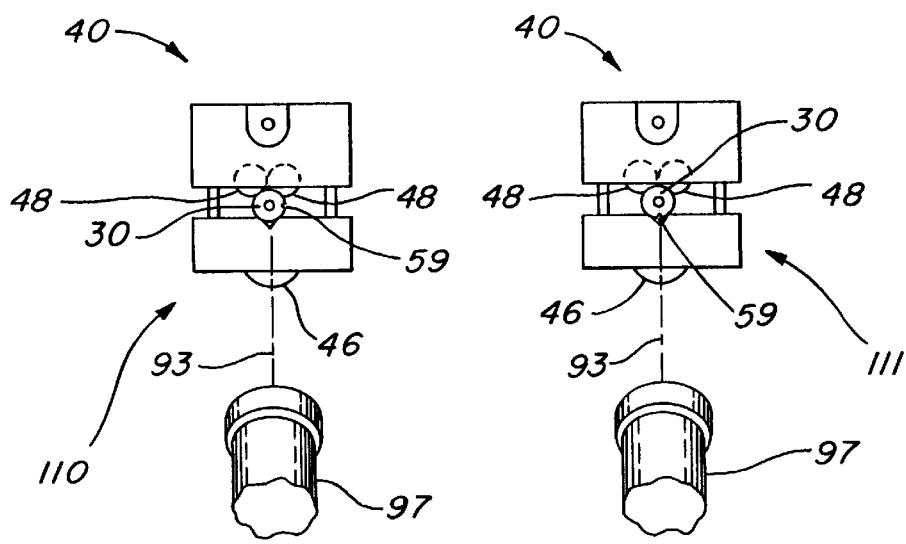
FIG. 11A an overhead view of the holding device of the subject invention with the cartridge case in a tangential orientation to the light source.
FIG. 11B an overhead view of the holding device of the subject invention with the cartridge case in a radial orientation to the light source.

FIGS. 11A and 11B provide a third alternative for orientating the ejector mark on the top of the head 31 of cartridge case 30. In this alternative, a roller mechanism consisting of rollers 48 and thumb wheel 46 allow the operator to orientate the ejector mark 59 on the cartridge case 30 top head 31 to the tangential position with respect to directional axis 93 of light 97 as depicted in FIG. 11A and the radial position with respect to directional axis 93 of light 97 as depicted in FIG. 11B. The roller mechanism consisting of rollers 48 and thumb wheel 46 will be described in detail below. Here again, rotating cartridge case 30 moves ejector mark 59 away from the imaging position 27. Thus, an additional translational move of cartridge mounting block 40 is necessary to reposition ejector mark 59 back at the imaging position 27. Those skilled in the art will realize such a repositioning of cartridge mounting block 40 can be easily accomplished with available devices. Given the need for the repositioning of the cartridge case 30 to place it back at the imaging position 27, in most applications, moving from the first predetermined position to the second predetermined position by rotating cartridge case holding device 40 would include an additional translational move to effectuate the repositioning.

III. The Cartridge Case

FIG. 5A and B depict the standard cartridge case 30, which would be imaged by the system. The cartridge case as depicted in FIG. 5A has a head 31, a rim 76 and casing jacket 78. Cartridge case 30 also has a longitudinal axis 75 which runs up through the center of cartridge case 30. As noted above, it is common knowledge in the industry that every firearm leaves an ejector mark on the cartridge case which are singular to that particular firearm. Referring now to FIG. 5B therein a view toward the top 31A of the head 31 of the cartridge case 30 appears. The firing pin mark 77 is located thereon at the center. Additionally, the ejector mark 59 appears thereon in the usual position, on the edge or the rim 76.

IV. The Cartridge Case Mounting Block

Cartridge case mounting block 40 FIG. 1 and its structure and use, will now be described in more detail. Cartridge case mounting block 40, as previously noted, has two parts, a first movable plate 42 which attaches to the second fixed plate 44. Referring to FIGS. 3, 4, and 6, as depicted therein, first plate 42 can be biased towards and detachably connected to plate 44 by shafts 50. Shafts 50 fit into channels 50A bored through plate 44 for this purpose. Connector devices that are known in the art, allow the operator of the system to detachably connect plate 42 to 44. Referring back to FIG. 1 and 6 plate 42 and 44 hold between them cartridge case 30.

Referring now to FIG. 6 the preferred embodiment has a mechanism to rotate the cartridge case 30 around its longitudinal axis 75 when the case is secured between plates 44 and 42. The purpose of rotating case 30 is to position the cartridge case 30 to place the ejector mark 59 on the top of the head 31 in the correct orientation for taking each of the images. Cartridge case 30 is held in place by three rollers. Two of the rollers, rollers 48 are partially imbedded in plate 44 on its face side 44A. One roller, roller 46 is imbedded in plate 42. The axis of rotation of each of the rollers is generally parallel to each other. Rollers 48 each have their own axial mechanisms 48A, well know in that art, which act as axis of rotation for each, allowing rollers 48 to freely rotate about that axis. When plate 44 is positioned for holding an object at imaging position 27 the axial mechanisms 48A for rollers 48 and thus their axis of rotation are parallel to the optical axis of the microscope 22.

Roller 46, in the preferred embodiment, is actually a thumb wheel which projects out of both sides of plate 42. Thumb wheel 46 has an axial mechanism 46A, which forms its axis of rotation and about which it freely rotates. FIG. 3 provides another exploded view of cartridge case mounting block 40. As can be seen, the face side 42A of detachable plate 42 has a V shaped channel 38 which runs down its face in a direction parallel to the axis of rotation 46A of thumb wheel 46. The portion of thumb wheel 46, which projects out of side 42B of plate 42 exposes enough of its rim for manual manipulation by an operator. The portion of wheel 46 which projects through to V channel 38 on the face of side 42A comes into contact with the cartridge case 30 and securely holds cartridge casing 30 when plate 42 on its face side 42A is detachably biases towards the face side 44A of plate 44 which has roller pair 48 projecting from it. Rollers 48 obviously hold cartridge case 30 from the opposite side. In fact, the cartridge case 30, in the preferred embodiment, would only come in contact with rollers 48 and thumb wheel 46 and thus the three rollers would securely hold cartridge case 30 for positioning and imaging. It will be readily seen by those skilled in the art that automated drive and control mechanisms could be incorporated into the holding device and the roller mechanisms in place of the thumb wheel. This would obviously provide for automated control of the rollers to orientate the cartridge case 30 specifically the ejector mark 59 on the top 31A of head 31 for imaging.

Thumb wheel 46 is built into plate 42 in a manner well know to those skilled in the art to allow it to be manipulated by the operator with tactile means on side 42B opposite the cartridge case 30 and thus allow the operator to rotate the cartridge case about its longitudinal axis 75. Longitudinal axis 75 as noted above passes through the center of the top 31 of cartridge case 30 and is parallel to the face sides 42A and 44A of plates 42 and 44 respectively when the cartridge case 30 is held by the rollers 48 and thumb wheel 46 between those plates. Thus, by manipulating thumb wheel 46 the operator can rotate the cartridge case 31 about its longitudinal axis and thus position ejector mark 59 in the appropriate position, in this case, at imaging position 27 for imaging. In the preferred embodiment depicted in FIG. 6 the 90 degree position is the precise imaging position 27 to which ejector mark 59 would be rotated for imaging. Microscope 22 FIG. 1 would focus on this point and magnify it appropriately for imaging by the CCD 24.

Referring now to FIG. 1, the top of plate 42 has a retaining or stopping plate 54. Retaining or stopping plate 54 is slidably connected to plate 42 so that it can be moved into a position in which blocks the movement of shell 30 in a longitudinal direction towards the microscope. After cartridge case 30 is properly positioned as described in more detail below plate 54 can be slid back out of the way to allow for complete viewing and imaging of the top 31 of the cartridge case 30.

In order to promote movement of the cartridge casing along its longitudinal axis towards the microscope, thumb wheel 46 has an axis of rotation which is set at an acute angle to the axis of rotation of rollers 48. In fact, if the two axis of rotation of rollers 48 were used to form an imaginary plane, the axis of rotation of thumb wheel 46, if projected in an imaginary line beyond its lower side, would cross at an acute or very slight angle the imaginary plane formed by the two axis of rollers 48. In the preferred embodiment this angle would be approximate 5 degrees. As can be seen, the positioning of thumb wheel 46 at an acute angle in effect, tilts the axis of thumb wheel 46 slightly away from the rotational axis of rollers 48 and the optical axis 72. Thus, by setting the angle of rotation of thumb wheel 46 at a slightly acute angle, and thus tilting it, turning thumb wheel 46 promotes movement of the cartridge case 30 in a direction along its longitudinal axis 75 towards the microscope 22. Thus, retaining or stopping plate 54 when moved into its blocking position would stop the longitudinal movement of cartridge case 30 along its longitudinal axis 75 and assist in appropriately positioning the cartridge case 30 at the correct imaging position 27. Upon completion of this maneuver, the operator then can move retaining plate 54 back out of the way to reveal the full view of the top 31A of the head 31 of cartridge case 30. Naturally, complete positioning of cartridge case 30 would include rotating the ejector mark 59 into the 90 degree position depicted on FIG. 6.

V. Ambient Light, Diffuse Light and Intensity of the Imaging Light

Not only must the images be taken with light projected from the appropriate angles but ambient light should be neutralized, diffuse light provided and the intensity of the lighting sources used to image the ejector mark adjusted so that the conditions are the same each time an image is taken. Excessively intense lighting can create glare and ruin the image obtained. Also, ambient light from the surroundings where the imaging takes place can corrupt the resulting images with excessive light and spurious shadows. Finally, and of considerable importance sufficient diffuse light must be provided to produce fully textured images with as many significant features illuminated to aid the expert in his analysis and comparison of the cartridge cases imaged. Purely directional light is too powerful and creates too much of a contrast from one direction. Additionally, most cartridge cases tend to be made of shinny brass which can create glare and wash out significant features on the top 31 of the head of the cartridge case 30. By adding generally diffuse light in combination with the directional lighting and the control of the intensity of the lighting the operator can obtain a much richer image and can see much more of the distinguishing features of the cartridge case or object imaged. The diffuse light allows one to generally see the object and its features while the directional lighting enhances certain features depending on the direction from which you project it. The optimal angles and positions from which to provide the directional light to produce suitable images for comparison and analysis being described elsewhere in this description. In the preferred embodiment the directional lighting would generally be the dominant light illuminating the ejector mark on the top of the cartridge case.

The invention provides a number of ways to achieve the desired lighting results. One method combines the directional lighting, as described above, provided by light sources 28 and 29 FIGS. 1, 2 etc. used in combination with ring light 26 FIG. 1. Ring light 26 would illuminate the object with axial symmetric lighting generally projected down at the top 31 of the cartridge case 30 in a diffuse pattern. In a further enhancement of this variation light intensity controls, well known in the art, can be used to control the intensity of the light produced by the ring light source 26 and directional light sources 28 and 29. To further enhance this variation a shroud placed around the lighting sources and cartridge case mounting block 40 to exclude or at least control ambient light can prove helpful in some instances. Naturally, other types of light sources placed in appropriate positions around the cartridge case could also provide the diffuse light.

Figures 7, 7A:
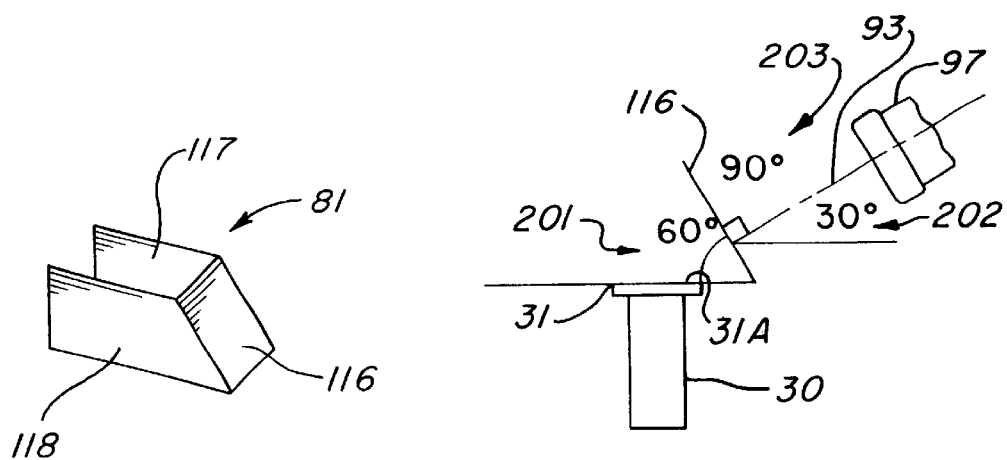
FIG. 7 is a perspective view of the a light diffuser used to practice one aspect of this invention.
FIG. 7A is a schematic view of the of the positioning of a sheet of the light diffuser in a preferred embodiment.
Figure 8:
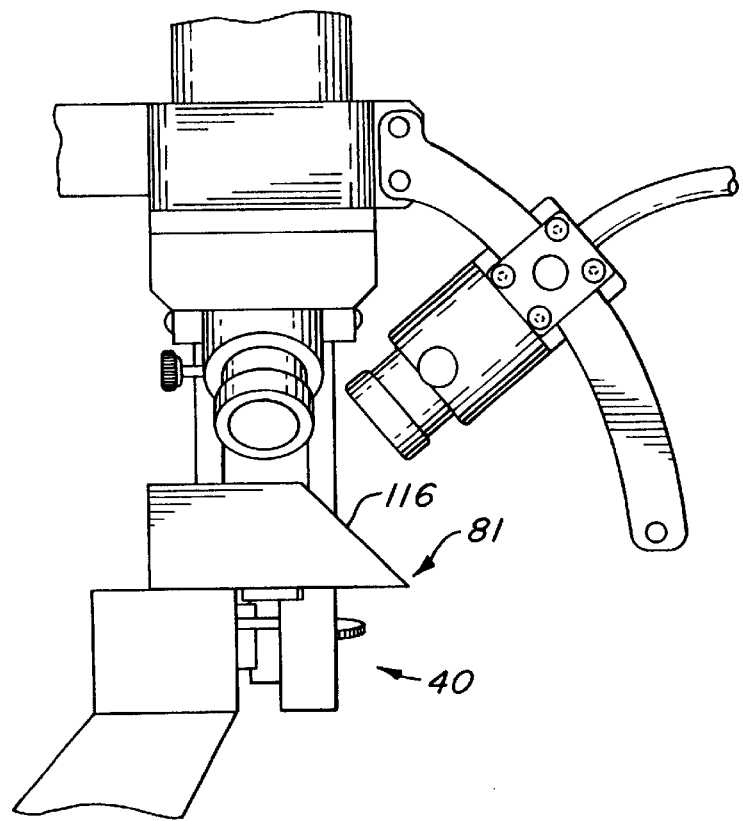
FIG. 8 is a perspective view of the apparatus of the preferred embodiment with the light diffuser positioned for use.

However, the preferred embodiment of this invention, because of the ease of use, employs a light diffuser 81 as depicted in FIG. 7. The diffuser 81, in the preferred embodiment, would fit over the cartridge case mounting block 40 as depicted in FIG. 8. The diffuser 81 places translucent opaque sheets 116 and 117 between light source 28 and 29 and the cartridge case 30 or the object to be imaged. The sheets, so placed filter out ambient light and compensate for the intensity of each of the light sources 28 and 29. This variation of the invention would most likely not use or need ring light 26. In the preferred embodiment, depicted in FIG. 8, sheet 116 of the diffuser faces the light source 28 and is approximately perpendicular to the directional axis of light source 28. Likewise sheet 117 of the diffuser 81 faces the light source 29 and is approximately perpendicular to the directional axis of light source 29. Also, the diffuser as depicted in FIGS. 7 and 8 encloses most of the area surrounding the imaging position 27, thus excluding effects of ambient light and spurious shadowing it can cause. The opaqueness of the sheets of the diffuser could be varied from being slightly frosted and almost clear, to relatively translucent or to generally opaque depending on the contrast one wants to achieve by emphasizing or de-emphasizing either the directional lighting coming directly from 28 and 29 and the diffuse light created by the light diffuser 81. The less frosted and thus clearer the sheets the more you emphasize the direct directional light and the more heavily frosted opaque and translucent the sheets the more you emphasize the diffuse light created by the diffuser. In the preferred embodiment the diffuser is substantially opaque making it generally cloudy and translucent. This is to provided substantial diffuse light but it still leaves the direct directional light more predominate.

FIG. 7A depicts the arrangement of one sheet of the light diffuser 81 in the preferred embodiment. Generally, sheet 116 makes an angle 201 as depicted in FIG. 7A of 60 degrees with the plane 31A of the top 31 of the cartridge case 30. The directional axis 93 of light source 97 then strikes the sheet 116 of the diffuser at a right angle 202. Thus, the angle 202 directional axis 93 makes with the plane 31A of the head 31 of cartridge case 30 is 30 degrees, line 205 being parallel to plane 31A. This is in conformance to the requirement that the directional axis of the light source strike the top 31 of the cartridge case 30 at an angle of 30 degrees.

VI. Operation of the System

As depicted in FIG. 1 cartridge case 30 would be securely placed in cartridge case holding block 40 as described above, with the top 31A of the head 31 directed at microscope 22. The operator would then move plate 54 to a blocking or stopping position and then manipulate with thumb wheel 46 to move the cartridge case 30 into the appropriate position. Cartridge case 30 would move along its longitudinal axis 75 towards microscope 22 until stopped by plate 54 now in the blocking position. In the preferred embodiment, the operator would make sure that the ejector mark 59 are set in the 90 degree position as indicated in FIG.

6. This would place the cartridge case 30 and the top 31A of head 31 in the ideal imaging position 27 with the ejector mark 59 in the correct orientation. Next light diffuser 81 would be placed in position as depicted in FIG. 8. In the preferred embodiment light source 29 would be in the radial position at an angle of approximately 30 degrees with the plane of the top 31 A of the head 31 and light 28 would be in the tangential position at an angle of approximately 30 degrees with the plane of the breech face. The first image would be taken with light source in the first predetermined position illuminating the imaging position 27. Then a second image would be taken with only the light source in the second predetermined position. Referring to FIG. 10 at each position of illumination the image relayed by microscope 22 to the CCD device 24 would be transmitted to a computer 83 which would process it and then store the information and have it available for appropriate imaging and comparative analysis when needed. The operator would control the computer through the usual means by keyboard 89 and mouse 91.

VII. Calibration

Finally, in the initial set up, a calibration step would be taken. Referring to FIGS. 1 and 6 The microscope 22, and CCD 24, would be calibrated on calibration point 56 set in depression 57 on plate 44. Calibration point 56 is in fact the end of a cylinder with a known internal and external circumference and predetermined distance between the internal and external circumference. Keying on these factors the microscope 22 can be calibrated both for focusing and precise magnification before the start of an imaging sequence. The stage of the microscope 22 is controllable for movement in the X-Y plane in a manner known to those skilled in the art. This would then provide for movement of block 40 into a position where the microscope 22 can focus on point 56 for calibration. After completion of the calibration step the microscope 22 would be repositioned over imaging position 27 for the imaging process.

VIII. Conclusion

Thus the invention described herein provides a standardized and systematized process and apparatus for acquiring images of ejector mark on cartridge cases, which images can be stored on a suitable medium, in the case of the preferred embodiment a computer memory system, for later use in comparative analysis by a ballistics expert. The apparatus and method allow the ballistics expert to compare the ejector mark on a cartridge case with the ejector mark on other cartridge case from a multitude of locations without having to reimage the actual cartridge cases each time. The apparatus and method allow the ballistics expert to rely on a trained technician to actually do the imaging and to store the images for later use by the expert.

While the invention has been particularly shown and described with reference to preferred embodiment thereof, it will be understood by those skilled in the art that various changes in form and detail may be made therein without departing from the spirit and scope of the invention.

We claim:

1. An apparatus for imaging an ejector mark on a cartridge case comprising:
    a cartridge case holding device mounted to hold, in a predetermined orientation, a cartridge case at an imaging position;
    an imaging device mounted with an optical axis positioned to image the cartridge case at the imaging position;
    a light source mounted in a first predetermined position to illuminate the cartridge case at the imaging position from a first predefined angle of illumination and in a second predetermined position to illuminate the cartridge case at the imaging position from a second predefined angle of illumination; and
    the holding device, the light source and the imaging device cooperating so that the imaging device can take a first image of the object with light for illumination from the first predefined angle of illumination and a second image of the object with the light from the second predefined angle of illumination;
    wherein said apparatus further comprises one of:
        a light diffuser placed between the light source and the cartridge case so that when the first and second images are taken some of the projected light is diffused around the cartridge case; and
    a diffuse light source placed to project diffuse light onto the cartridge case;
    whereby the images obtained can be used for comparative analysis.

2. The apparatus as claimed in claim 1, wherein the predefined angle a directional axis of the light source makes with respect to a plane of a top of a head of the cartridge case held by the holding device at the imaging position can be at any one angle in a range of from one to ninety degrees.

3. The apparatus as claimed in claim 1, wherein the predefined angle a directional axis of the light source makes with respect to a plane of a top of the head of the cartridge case held by the holding device at the imaging position in a predetermined orientation is approximately 30 degrees.

4. The apparatus as claimed in claim 1, wherein the light source mounted to illuminate the cartridge case at a first and second predetermined positions further comprises: the light source mounted in a fixed position and the holding device being mounted for rotatable movement to position the cartridge case for imaging at the first predetermined position of illumination so that the first image can be obtained and then rotated to the second predetermined position of illumination so that the second image can be obtained.

5. The apparatus as claimed in claim 1, wherein the light source mounted to illuminate the cartridge case at a first and second predetermined positions further comprises: the light source mounted for movement from the first predetermined position to the second predetermined position so that the first image and second image may be obtained.

6. The apparatus as claimed in claim 1, wherein the optical axis of the imaging device is perpendicular to the plane of a top of the head of the cartridge case held by the holding device.

7. The apparatus as claimed in claim 1, wherein an optical axis of the imaging device is centered on an ejector mark on a top of the head of the cartridge case.

8. The apparatus as claimed in claim 1, wherein a directional axis of the light source at the first predetermined position for imaging is in a tangential orientation to the an ejector mark on the cartridge case and the directional axis of the light source at the second predetermined position for imaging is in a radial orientation to the ejector mark on the case.

9. The apparatus as claimed in claim 1, wherein the angle between a directional axis of the light source at the first predetermined position and the directional axis of the light source at the second predetermined position for imaging purposes can be any one angle in a range of from 1 to 179 degrees.

10. The apparatus as claimed in claim 1, wherein the angle between a directional axis of the light source at the first predetermined position and the directional axis of the light source at the second predetermined position is ninety degrees.

11. The apparatus as claimed in claim 1, wherein the light source mounted to illuminate the cartridge case at the first predetermined position and the light source mounted to illuminate the cartridge case at the second predetermined position comprises:

a first light source mounted in the first predetermined positioned for illuminating the cartridge case held by the holding device for obtaining the first image by the imaging device; and a second light source mounted in the second predetermined position for illuminating the cartridge case held by the holding device for obtaining the second image by the imaging device.

12. The apparatus as claimed in claim 1, wherein the light source mounted to illuminate the cartridge case at a first and second predetermined position comprises:

the light source mounted in a fixed position and the cartridge case mounted for rotation between the first predetermined position of illumination and the second predetermined position of illumination.

13. The apparatus as claimed in claim 1, wherein the holding device comprises a first plate with a face side and a second plate with a face side and the plates being detachably biased towards each other on their face sides so that they securely hold there between a cartridge case with a longitudinal axis of the cartridge case approximately parallel to the face of the first plate and the face of the second plate so that a top of the head of the cartridge case is in the imaging position.

14. The apparatus as claimed in claim 13, wherein the holding device comprises further means to rotate the cartridge case about its longitudinal axis.

15. The apparatus as claimed in claim 14, wherein the rotating means comprises at least one roller on the face of the first plate and two rollers on the face of the second plate, the axis of rotation of all of the rollers being substantially parallel to each other, and the rollers being placed such that when the faces of the plates are joined together the rollers can securely hold there between the cartridge case, with the longitudinal axis of a cartridge case parallel to the axis of the rollers so that the rollers can also rotate the case about its longitudinal axis.

16. The apparatus as claimed in claim 15, wherein the roller on the face of the first plate comprises a thumb wheel accessible to and manipulatable by a human hand so that the cartridge case can be manually rotated about its longitudinal axis.

17. The apparatus as claimed in claim 15, wherein the rollers have a drive and control mechanism for rotation of the cartridge case about its longitudinal axis.

18. The apparatus as claimed in claim 15, wherein the axis of rotation of at least one of the rollers is set at an acute angle to the others to allow for movement of the case along its longitudinal axis.

19. The apparatus as claimed in claim 18, wherein when the axis of rotation of the at least one roller set at an acute angle is extended in a direction opposite and away from an imaging side of the holding device intersects a plane formed by the axis of rotation of the two other rollers, the cartridge case held in the holding device moves along its longitudinal axis towards the imaging side of the holding device on rotation of the rollers.

20. The apparatus as claimed in claim 19, wherein the holding device further comprises a plate slidably attached to its imaging side with the plane of the plate perpendicular to the longitudinal axis of the cartridge case held by the holding device, the plate being attached for movement between a blocking position where it stops the longitudinal movement of the case to a retracted non-blocking position.

21. The apparatus as claimed in claim 1, further comprising a light diffuser placed between the light source and the cartridge case so that when the first and second images are taken some of the projected light is diffused around the cartridge case.

22. The apparatus as claimed in claim 21, wherein the light diffuser comprises a detachable shield cover of translucent material which fits over and at least partially covers the imaging position.

23. The apparatus as claimed in claim 1, further comprising a diffuse light source placed to project diffuse light onto the cartridge case.

24. The apparatus as claimed in claim 23, wherein the diffuse light source comprises a ring light.

25. The apparatus as claimed in claim 1, further comprising: an object with known dimensions preset at a calibration point for imaging and calibration by the imaging device.

26. A method for imaging an ejector mark on a cartridge case comprising:

placing at an imaging position a cartridge case holding device for holding a cartridge case in a predetermined orientation for imaging;

positioning an imaging device so that its optical axis is positioned to image a top of a head of a cartridge case being held by the holding device, said optical axis being substantially perpendicular to a plane of said head of said cartridge case;

positioning a light source at a first predetermined position for illuminating at a first predefined angle the cartridge case held by the holding device;

illuminating the cartridge case with the light source at the first predetermined position of illumination;

obtaining a first image with the imaging device;

removing the illumination by the light source;

positioning a light source at a second predetermined position for illuminating at predefined angle the cartridge case held by the holding device;

illuminating the cartridge case with the light source at the second predefined angle of illumination;

obtaining a second image with the imaging device; and using the images obtained for comparative analysis.

27. The method of claim 26, wherein the step of positioning the light source at the first predetermined position involves rotating the holding device, which holds the cartridge case at the imaging position, to position the cartridge case at the first predetermined position of illumination and the step of positioning the light source at the second predetermined position of illumination involves rotating the holding device, which holds the cartridge case at the imaging position, to position the cartridge case at the second predetermined position of illumination.

28. The method of claim 26, wherein the step of positioning the light source at the first predetermined position of illumination involves placing a first light source at the first predetermined position of illumination and the step of positioning the light source at the second predetermined position of illumination involves placing a second light source at the second predetermined position of illumination.

29. The method of claim 26, wherein the step of positioning the light source at the first predetermined position of illumination involves rotating the cartridge case, held by the holding device at the imaging position, so that the cartridge case is positioned at the first predetermined position of illumination and the step of positioning the light source at the second predetermined position of illumination involves rotating the cartridge case, held by the holding device at the imaging position, so that the cartridge case is positioned at the second predetermined position of illumination.

30. The method of claim 26, wherein the step of positioning the light source at the first predetermined position of illumination involves moving the light source to the first predetermined position of illumination and the step of positioning the light source at the second predetermined position of illumination involves moving the light source to the second predetermined position of illumination.

31. The method of claim 26, wherein the step of positioning the light source at the first predetermined position of illumination comprises placing it so that a directional axis of the light source forms the first predefined angle at any one angle in a range between one degree to 89 degrees with a plane of the top of the head of the cartridge case at the imaging position and the step of positioning the light source at the second predetermined position of illumination involves placing it so that a directional axis of the light source forms the second predefined angle at any one angle in a range between one degree to 89 degrees with a plane of the top of the head of the cartridge case held at the imaging position by the holding device.

32. The method of claim 31, wherein the step of positioning the light source at the first and then the second predetermined position of illumination comprises:
  positioning them such that an angle between the directional axis of the light source at the first predetermined position of illumination and the directional axis of the light source at the second predetermined position of illumination can be at any angle in a range of from 1 degree to 179 degrees.

33. The method of claim 26, wherein the step of positioning the imaging device includes centering the optical axis on an ejector mark on the top of the head of the cartridge case.

34. The method of claim 26, wherein the step of positioning the light source at the first predetermined position comprises positioning it in a tangential orientation to the ejector mark on the cartridge case and the step of positioning the light source at the second predetermined position comprises positioning it in a radial position to the ejector mark on the cartridge case.

35. The method of claim 34, wherein the step of positioning the light source at the second predetermined position of illumination further comprises positioning it so that a directional axis of the light source at the second predetermined position of illumination forms a perpendicular angle to a directional axis of the light source at the first predetermined position of illumination.

36. The method of claim 35, wherein the step of positioning the light source comprises positioning it so that the directional axis of the light source, when positioned at the first predetermined position of illumination forms the first predefined angle of 45 degree to a plane of the top of the head of the cartridge case and when positioned at the second predetermined position of illumination forms the second predefined angle of 45 degree to a plane of the top of the head of the cartridge case.

37. The method of claim 26 further comprising the further step of projecting diffuse light onto the cartridge case when obtaining the 1st and 2nd image.

38. The method of claim 37 wherein the step of projecting diffuse light comprises projecting axial symmetric light from a ring light.

39. The method of claim 26 comprising the further step of partially diffusing the light which illuminates the cartridge case at the first and second angles of illumination.

40. The method of claim 39 wherein the step of partially diffusing the light comprises placing a light diffuser around the cartridge case.

41. A method for imaging an ejector mark on a cartridge case comprising;
  placing a cartridge case at an imaging position;
  orientating the cartridge case into a predetermined orientation for imaging, with an optical axis substantially perpendicular to a plane of a head of said cartridge case;
  projecting light for illumination at first predefined angle towards the cartridge case;
  taking a first image of the cartridge case;
  projecting light for illumination at a second predefined angle towards the cartridge case;
  taking a second image of the cartridge case; and
  using the images obtained for comparative analysis.

42. The method of claim 41 wherein the step of projecting light for illumination at a first predefined angle includes positioning a first light source at a first predetermined position to project light at the first predefined angle and the step of projecting light at the second predefined angle includes positioning a second light source at a second predetermined position to project light at the second predefined angle.

43. The method of claim 41 wherein the step of projecting light for illumination at the first and then second predefined angles includes positioning a light source for movement between a first predetermined position for projecting light at the first predefined angle and then moving the light source to a second predetermined position for projecting light at the second predefined angle.

44. The method of claim 41 wherein the step of projecting light for illumination at a first and then a second predefined angle comprises mounting a light for illumination and then positioning the cartridge case at a first predetermined position so that illumination from the light projects towards the cartridge case at the first predefined angle and then positioning the cartridge case at a second predetermined position so that the illumination from the light projects towards the cartridge case at the second predefined angle.

45. The method of claim 41 further comprising the further step of projecting diffuse light onto the cartridge case when obtaining the 1st and 2nd image.

46. The method of claim 45 wherein the step of projecting diffuse light comprises projecting axial symmetric light from a ring light.

47. The method of claim 46 comprising the further step of partially diffusing the light which illuminates the cartridge case at the first and second angles of illumination.

48. The method of claim 47 wherein the step of partially diffusing the light comprises placing a light diffuser around the cartridge case.

49. The apparatus as claimed in claim 1, further comprising a computer for storing said images.

50. The method of claim 26, further comprising storing said images in a computer.

* * * * *